United States Patent [19]

Lawrence

[11] 4,358,678
[45] Nov. 9, 1982

[54] FIBER OPTIC TRANSDUCER AND METHOD
[75] Inventor: William R. Lawrence, Houston, Tex.
[73] Assignee: Hersey Products, Inc., Dedham, Mass.
[21] Appl. No.: 208,245
[22] Filed: Nov. 19, 1980
[51] Int. Cl.³ .............................................. G02B 5/14
[52] U.S. Cl. ................................. 250/227; 250/231 R
[58] Field of Search ........................... 250/227, 231 R
[56] References Cited
U.S. PATENT DOCUMENTS
4,297,684 10/1981 Butter ............................ 250/227 X Primary Examiner—David C. Nelms
Assistant Examiner—Darwin R. Hostetter
Attorney, Agent, or Firm—Gunn, Lee & Jackson

[57] ABSTRACT

A method and apparatus for detecting and measuring mechanical movement that is directly or indirectly representative of a physical phenomenon. The method and apparatus involve the use of at least one optical fiber that defines a region of bend having a curvature, the radius of which varies in direct relation with the particular mechanical movement that is induced by the physical phenomenon. Light is introduced into one extremity of the optical fiber and propagates through the fiber where the intensity of the light emitted or radiating from the opposite extremity of the fiber is measured. Differentiation between introduced light and emitted light determines the degree of perturbance caused by the region of bend and is thus representative of the physical phenomenon that alters the radius of curvature at the region of bend.

24 Claims, 5 Drawing Figures

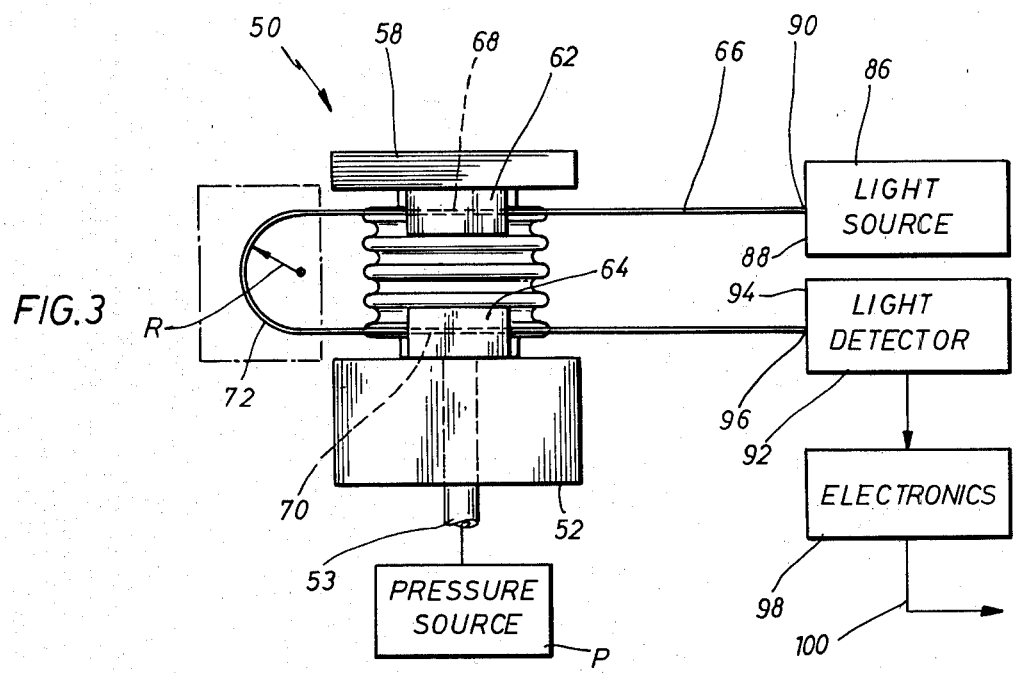
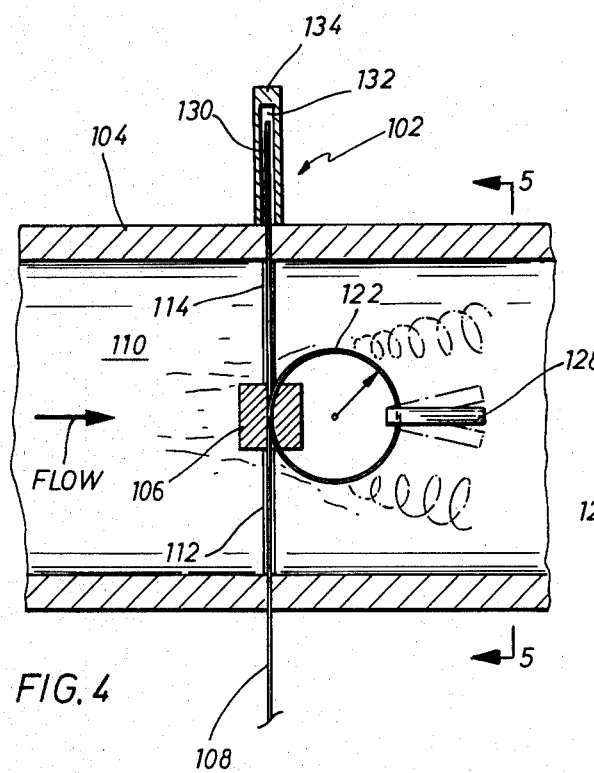
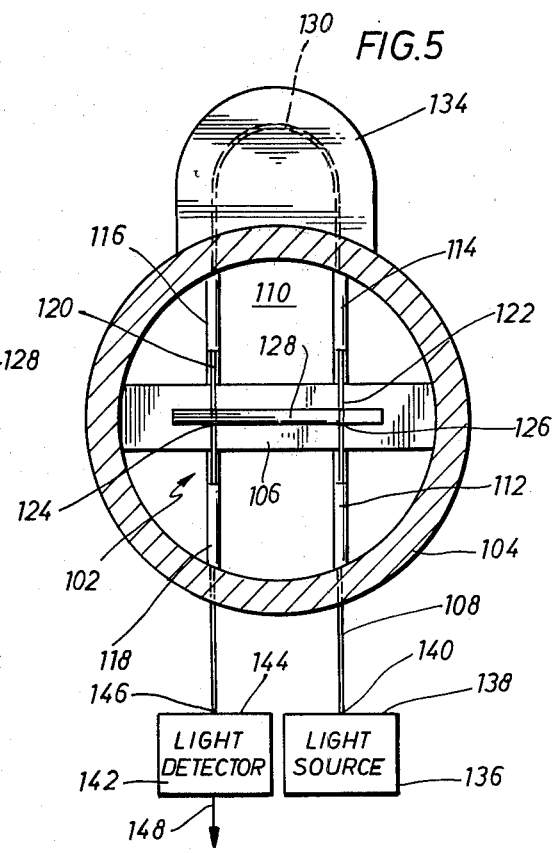

FIBER OPTIC TRANSDUCER AND METHOD

FIELD OF THE INVENTION

This invention relates generally to detection and measurement of physical phenomenon and more particularly relates to a method and apparatus for detecting and measuring various physical phenomenon and more specifically to utilization of optical fiber material in conjunction with a method of detecting and measuring such physical phenomenon.

BACKGROUND OF THE INVENTION

Apparatus of various character has long been utilized for the purpose of detecting and measuring certain physical phenomenon. For example, in the measurement of mechanical movement, the character of the mechanical movement involved typically dictates the character of the equipment necessary for measurement of the same. In a case of mechanical structures which are subjected to internal pressure, strain gauges may be employed to measure the dimensional changes that are induced by the internal pressure. In the case of mechanical movement of more significant nature, mechanical devices such as micrometers are employed and electrical sensors may also be employed to detect such mechanical movement.

Under certain circumstances it is desirable to measure the flow of fluid such as liquid through a conduit. In the past, this has been accomplished by providing certain types of flow meters such as turbine flow meters, vortex-shedding type flow meters as well as many other flow measurement devices. Most of the flow measurement devices develop either mechanical or electrical interference with the flowing fluid and in many cases such interference is quite undesirable. It is desirable to provide a system for detecting and measuring the flow of fluid through a conduit wherein the flow measurement device or system does not develop mechanical or electrical interference to fluid flow.

In certain cases, it is necessary to measure the extent to which a mechanical object expands and contracts during the various phases of its activity. Many mechanical and electrical devices are provided for the purpose of measuring mechanical expansion and contraction of objects but, for the most part, such devices are complex, are of relatively expensive nature and, in many cases, lack the degree of accuracy that might be desired. Further, it may be desirable that the measuring device or system be such as to permit accurate measuring without the possibility of introducing any mechanical or electrical interference with the object being measured. Few, if any, known measuring devices have this desirable facility.

SUMMARY OF THE INVENTION

It is a primary feature of the present invention to provide a novel method and apparatus for detecting and measuring mechanical movement that is directly or indirectly representative of a physical phenomenon and which utilizes an optical fiber system for the purpose of accomplishing such measurement.

It is also a feature of the present invention to provide a novel method and apparatus for detecting and measuring mechanical movement which is of electrical nature and yet does not require the use of wires, electrical currents or electromagnetic wave interference in or about the physical phenomenon being measured.

It is another important feature of this invention to provide a novel method and apparatus for detecting and measuring mechanical movement which measurement can be conducted free of any danger of electrical shock, fire or explosion in the event the mechanical movement of interest involves combustible or explosive material.

It is an even further feature of the present invention to provide a novel method and apparatus for detecting and measuring mechanical movement by means of an optical fiber system wherein the mechanical movement may be induced in response to various physical phenomenon such as the activity of a flowing fluid medium, the activity of increasing or decreasing pressure, expansion or contraction of a mechanical object as well as various other physical phenomenon.

It is an even further feature of this invention to provide a novel method of detecting and measuring mechanical movement wherein such movement is converted by the perturbed total internal reflection of light waves passing through one or more optical fibers to an electrical phenomenon that can be observed.

Other and further objects, advantages and features of the present invention will become apparent to one skilled in the art upon consideration of this entire disclosure, including this specification and the annexed drawings. The form of the invention, which will now be described in detail, illustrates the general principles of the invention, but it is to be understood that this detailed description is not to be taken as limiting the scope of the present invention.

Briefly, the present invention relates to an optical fiber transducer system incorporating one or more optical fibers that are physically arranged in accordance with the particular physical phenomenon being detected and measured. In each case, the optical fiber or fibers is formed to define a region of bend wherein the radius of the curvature of the region of bend is of variable nature and wherein the curvature of the region of bend is caused to vary in accordance with the mechanical aspects of the physical phenomenon involved. Also in each case, the optical fiber system incorporates a light source for transmitting light into the optical fiber or fibers and a light sensitive measurement system having the capability of detecting and measuring the intensity of light waves being propagated through the optical fiber and being emitted at the end thereof opposite the light source. As the radius of curvature of the region of bend is decreased, perturbance of the light waves being emitted from the optical fiber also decreases, thereby causing light rays propagating through the optical fiber by total internal reflection to represent a decrease in the intensity of the emitted light signal. Through utilization of light sensitive electronic equipment, the intensity of the emitted light signal is detected and converted into an electrical signal that represents the character of bend or curvature in the region of bend at any point in time. By establishing the particular emitted light intensity that is determined by a particular radius of curvature in the region of bend, the optical fiber transducer can be simply and efficiently calibrated with respect to the physical phenomenon involved. Changes in the physical phenomenon which induce decrease or increase in the radius of curvature in the region of bend are thereby accurately represented in the form of an electrical signal that is converted from the detected light intensity being emitted from the optical fiber system. By appropriate observation of the receiver signal, the optical fiber system becomes a detector of physical motion, if that physical motion results in modifying the state of curvature of the region of bend in the optical fiber.

By employing the optical fiber sensor system, a sensor is readily developed having the capability of converting the speed of flowing fluid into a light signal, the intensity of which is representative of the speed of the flowing fluid. A fluid flow meter is, therefore, capable of being developed simply by providing an optical fiber sytem having a region of bend and wherein the region of bend is altered in accordance with the speed of the flowing fluid medium. For example, a vortex shedding type flow meter may be provided incorporating a vortex sensitive element that is movable responsive to the vortices developed in the flowing fluid medium by an object positioned in the flow stream of a laminar flowing fluid. The optical fiber system may be interconnected physically with the movable vortex responsive element and, therefore, movement induced to the element by the vortices is converted efficiently into variation in the curvature of the optical fiber system in the region of bend. As the movable element oscillates within the flowing fluid responsive to the vortices, this oscillation is rendered by the optical fiber system to an electrical signal that is representative of the vortices and thus also representative of the velocity of the flowing fluid.

In accordance with the present invention, a fluid pressure sensitive transducer may be provided which incorporates a variable volume chamber which may be evacuated and which is capable of expanding and contracting in response to fluid pressure. Expansion and contraction of the chamber may be converted efficiently into a simple mechanical movement and an electrical signal representative of this mechanical movement may be simply and efficiently provided by an optical fiber system that detects the mechanical movement. For example, the variable volume chamber may conveniently take the form of a bellows structure having an arm at the movable extremity thereof. As the bellows structure expands or contracts due to changes in internal pressure, the movable arm will change its position relative to the immovable base portion of the bellows structure, representing a simple mechanical movement. By interconnecting an optical fiber system to the movable and immovable portions of the bellows structure such that this relative movement will induce changes in curvature of the region of bend of the optical fiber, the optical fiber system will emit representative light intensities, have a value that represents fluid pressure. The pressure representative light signals are then converted into pressure representative electrical signals that may be further processed or utilized as appropriate to the various characteristics desired by the user.

An optical fiber transducer may also be employed which detects and measures changes in the physical size of a mechanical object. A sensor may be employed which converts the changing spatial extent of the cross-sectional area of an entity into corresponding changes of light intensity. The changes in light intensity are then processed to define electrical signals that are representative of size and size changes that occur in the object being measured. This feature is efficiently accomplished by providing an optical fiber system incorporating one or more optical fibers that are formed in the nature of a figure "8" to define two loops by intermediate crossing of the fibers. The larger of the loops is positioned about the object to be measured while the smaller of the loops defines a region of bend. The combined cross-sectional area of the two loops of the figure "8" is caused to remain the same. As the larger loop is caused to expand and contract by cross-sectional dimensional changes of the object involved, the small loop defining the region of bend is caused to expand or contract in corresponding manner. The double looped optical fiber system is provided with light emitting and detecting apparatus as described above. As the object expands, causing expansion of the larger one of the loops, the smaller loop is caused to contract, thereby decreasing the radius of curvature in the region of bend. This causes a higher degree of perturbance, thereby resulting in diminished light wave reflection and decreased intensity of the light being emitted from the optical fiber system. Upon contraction of the object being measured, the larger of the two loops becomes diminished thereby causing expansion of the smaller one of the two loops. Expansion of the smaller loop thereby increases the radius of curvature in the region of bend and thereby causes a consequent increase in the intensity of light being emitted and detected by the light signal detector.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only a typical embodiment of the invention and is, therefore, not to be considered limiting of its scope, for the invention may admit to other equally effective embodiments.

In the drawings:

Figure 1:
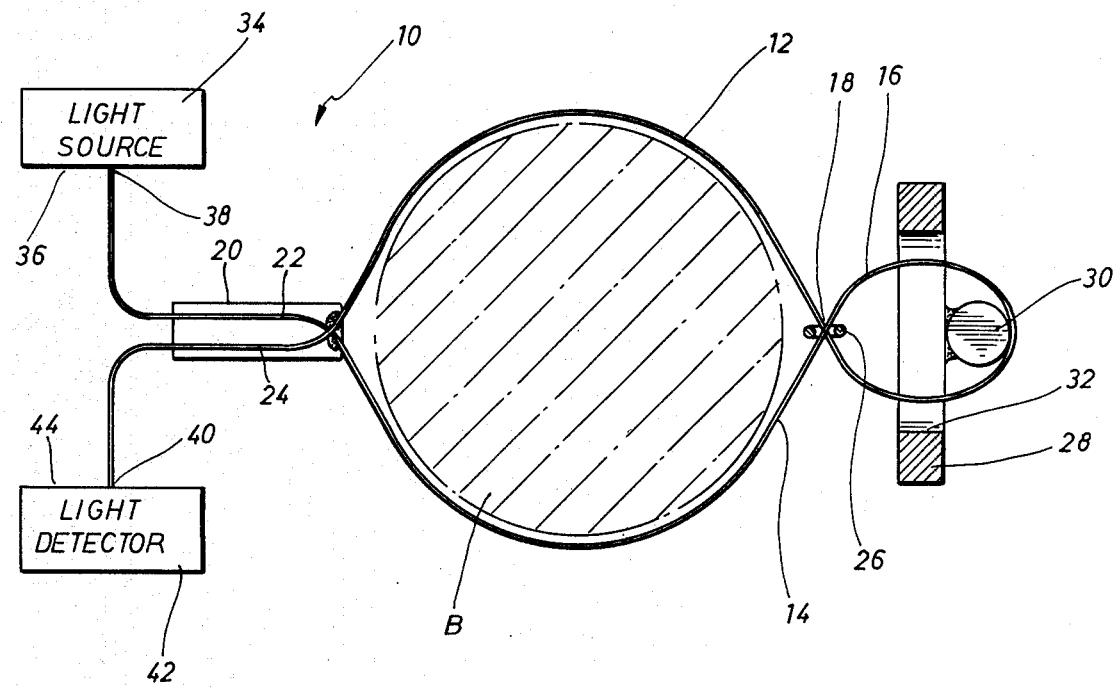

The present invention, both as to its organization and manner of operation, together with further objects and advantages thereof may best be understood by way of illustration and example of certain embodiments when taken in conjunction with the accompanying drawings in which:

FIG. 1 is a view of an optical fiber transducer that is arranged to detect expansion and contraction of an object encompassed within one loop of a two loop, figure "8" type fiber arrangement.

Figure 2:
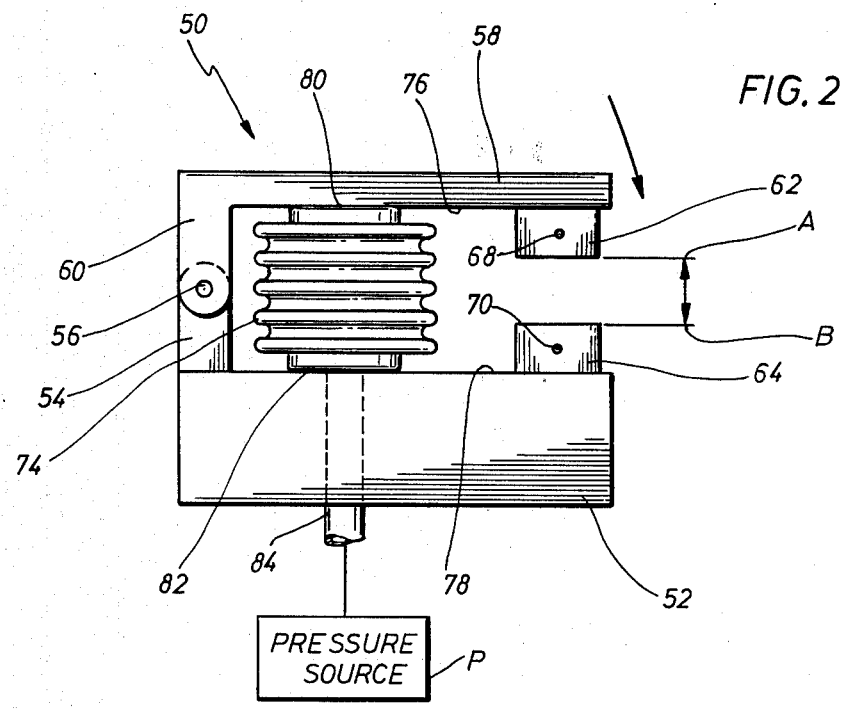

FIG. 2 is an elevational view of a pressure responsive optical fiber transducer that is constructed in accordance with the present invention and represents an alternative embodiment.

FIG. 3 is an elevational view of the optical fiber transducer system of FIG. 2 taken along line 3—3 of FIG. 2.

FIG. 4 is a sectional view of a flow conduit system incorporating an optical fiber flow meter system that represents a further embodiment of the present invention.

FIG. 5 is a sectional view taken along line 5—5 of FIG. 4 and illustrating further structural details of the optical fiber flow meter system.

DETAIL DESCRIPTION OF THE PREFERRED EMBODIMENTS

The physical phenomenon which is utilized in all aspects of the fiber optic transducer system of this invention may be referred to as "perturbed total internal reflection". It is intended that the term "optical fiber" mean one or more optical fibers. An optical fiber is provided and is oriented such that a portion of the fiber defines a region of bend having a variable radius of curvature that changes responsive to the physical phenomenon that is involved. A light wave transmitter or light source is positioned at one extremity of the optical fiber and transmits light waves directly into the fiber by having the end of the fiber positioned in abutting or closely spaced relation with the light source of the light transmitter. A large fraction of the light rays which enter the transmitting end of the optical fiber will remain captured inside the fiber as the light waves propagate toward the opposite extremity of the optical fiber, which may be referred to as the light emitting extremity. An optical receiver is positioned at the light emitting extremity of the optical fiber and is adapted to measure or otherwise detect the intensity of the light waves being emitted at the emitting extremity of the optical fiber. From the standpoint of optical physics, as the light rays propagate through the optical fiber, the light waves remain inside the fiber by "total internal reflection". When the light waves arrive at the receiver positioned at the emitting extremity of the optical fiber, the light waves radiate out of the emitting extremity and are detected by the detection mechanism of the receiver. This process "the received signal" can be perturbed by bending the fiber. By the term "perturbed" is meant that some of the rays escape the inside of the fiber as they propagate along and inside the "region of bend" in the fiber. Under circumstances where the region of bend has a curvature that is excessively small or sharp for some of the light rays, those particular light waves leak out of the optical fiber and are lost. When the light waves leak out in this manner, the resulting light signal being emitted at the emitting extremity of the optical fiber is of less intensity than the light waves being introduced into the light transmitting extremity. By appropriate observation of the receiver signal, the optical fiber becomes a detector of physical motion, if that physical motion results in modifying the state of curvature (the region of bend) of the optical fiber.

In accordance with the present invention, the optical fiber system of the transducer is positioned such that the optical fiber defines a region of bend having a present bend which may be in the shape of a "U" or may be of "O" shaped configuration. The mechanical linkage of suitable nature is then interconnected with the optical fiber in such a manner that movement of the mechanical linkage causes a consequent increase or decrease in the degree or radius of curvature in the region of bend of the fiber. By observation of the changes in intensity of the emitted light propagating through the optical fiber system, it will be observed that these changes in light intensity are representative of consequent changes in the physical phenomenon being detected. By appropriate calibration, an efficient transducer system may be simply and efficiently developed that allows detection of changes in the physical phenomenon involved wherein the changes can be monitored quite efficiently.

Referring now to the drawings and first to FIG. 1, there is shown in optical fiber transducer system that is provided for the purpose of measuring dimensional changes in an object. The optical fiber transducer system is illustrated generally at 10 and incorporates a length of optical fiber 12 that is formed in such a manner as to define a large loop 14 and a small loop 16. The optical fiber 12 is formed so that an intermediate portion thereof crosses itself as shown at 18 so that the optical fiber is generally in the form of a figure "8". A constraint is provided as shown at 20 which is structurally interconnected with portions 22 and 24 of the optical fiber 12 so that portions 22 and 24 of the fiber are restrained in fixed relation with one another. This fixed relation causes the loops 14 and 16 to encompass a specific combined cross-sectional dimension which does not vary regardless of the relative sizes of the loops. A loose constraining means 26 is provided to encompass the intersection 18 that is defined by the crossed portions of the optical fiber 12. The loose constraining means 26 functions only to maintain the intersecting portions of the optical fiber in close proximity to one another and yet allows the optical fibers to slide with respect to one another and to move through the opening defined by the loose constraining means. The loose constraining means 26 may conveniently take the form of a ring or grommet that is composed of any suitable material such as plastic, metal, glass, etc.

A support structure 28 is provided which defines a structural support for a third constraining element 30 about which the small loop 16 of the optical fiber extends. The small loop 16 extends an opening 32 defined by the support structure 28 and then passes about the constraining element 30. The constraining element 30 has a diameter which represents the minimum possible diameter of the small loop 16.

With the first constraining element 20 being in fixed relation with portions 22 and 24 of the optical fiber, it is apparent that expansion and contraction of the measured body B will cause a consequent expansion or contraction of the large loop 14, thereby causing consequent contraction or expansion of the small loop 16 defined by the optical fiber. The small loop 16 defines a region of bend which causes the light waves passing through the optical fiber to be perturbed, thus frustrating total internal reflection to at least some degree even at the largest dimension of the small loop 16. Any reduction in the radius of the region of bend that is caused by expansion of the body B, therefore, causes further perturbance of the light waves passing through the optical fiber thereby resulting in consequent frustration of total internal reflection in direct proportion to the mechanical expansion that has occurred.

There is provided a light source 34 having a light emitting portion 36 thereof positioned in abutting or closely spaced relation with the light emitting extremity 38 of the optical fiber. Light waves are thus introduced by the light source 34 into the optical fiber at an intensity that is determined by the intensity of the light source. The light waves propagate through the optical fiber 12 by the process referred to as total internal reflection and are emitted at an emitter extremity 40 of the optical fiber. A light detector is provided as shown at 42 having a light intensity detection portion 44 thereof positioned in abutting relation with the emitting extremity 40 of the optical fiber. The light detector 42 may be of any suitable nature capable of detecting the intensity of the light emitted and converting the light intensity into an electrical signal that is directly representative of the light intensity. For example, the electrical signal may conveniently be in the form of an analog signal, the characteristics of which represent light intensity.

Although the transducer system set forth in FIG. 1 may be utilized for measurement of expansion and contraction of various physical bodies, it has particular application in the medical field for the monitoring of patients. For example, the large loop 14 may be positioned in encompassing relation about the thorax of a patient under medical treatment and the dimensional changes of the thorax portion of the patient which occurs upon breathing may be efficiently monitored. The light detector apparatus 42 may be arranged to provide a graphical chart representative not only of the breathing rate of the patient but of any volumetric changes in intake and expulsion of air that occur at various times during the period of monitoring. In another form suitable for medical monitoring, the transducer mechanism 10 may be conveniently utilized as a tumescence sensor that indicates certain medical characteristics of the patient upon detection of the physical changes that occur during tumescence.

The first constraining element 22 may have the characteristics of adjustably clamping the portions 22 and 24 of the fiber in fixed relation. By loosening the clamp structure and shifting the fiber portions 22 or 24 or both, the combined dimensional characteristics of the large and small loops may be modified. This feature may be effectively utilized for the purpose of calibrating and setting the response parameters of the large and small loops. It functions as a "0-set" control. Although the large and small loops 14 and 16 are defined by orienting the optical fiber 12 in the form of a figure "8" configuration, it is not intended to restrict the present invention to this particular optical fiber configuration. It is within the scope of this invention to orient the optical fiber into any suitable spatial configuration in order that the increase in diameter of the large loop will result in the consequent decrease of the diameter of the small loop. The small loop will always be the cause of the change in detected signal in the form of a change in light intensity because it will always be the loop of smallest diameter, defining the curvature of greatest perturbance. Under circumstances where other portions of the optical fiber are formed to define curved portions, as long as these curved portions are stabilized against movement, they will not effect the function or accuracy of the optical fiber transducer system. In other words, the transducer system may be zeroed, thus accommodating any perturbance that occurs by virtue of optical fiber bends that are not encompassed within the variable loops such as shown in FIG. 1.

It may also be desirable to provide an optical fiber transducer system having the capability of responding to variations in fluid pressure. A pressure sensitive optical fiber transducer therefore may conveniently take the form illustrated generally at 50 in FIGS. 2 and 3. The optical fiber transducer at 50 may incorporate a substantially immovable base portion 52 such as might be mounted on any physical structure that is capable of providing stabilized support for the transducer. One or more upstanding posts 54 extend from the base structure 52 and are formed to receive a pivot element 56 in assembly therewith. A movable frame element 58 is movable relative to the base structure 52 and incorporates one or more pivot arms 60 that are interconnected by the pivot pin 56 with the post structure 54. Thus, the frame structure 58 is pivotally interconnected with the base structure 52. Upper and lower optical fiber support elements 62 and 64 are supported respectively by the frame element 58 and the base structure 52 and one or more optical fibers 66 are provided such that portions 68 and 70 thereof are secured in substantially immovable relation with respect to the support elements 62 and 64. The optical fiber 66 is also formed to define a region of bend 72 which is encompassed within broken lines as shown in FIG. 3 and which defines a variable radius of curvature which is identified by the radius arrow R. As portions 68 and 70 of the optical fibers 66 are subjected to relative movement, the radius R in the region of bend 72 either increases or decreases and thus causes a corresponding increase or decrease of perturbance which is detected by suitable electronic circuitry.

A pressure containing bellows structure 74 is positioned in contact with internal surfaces 76 and 78 that are defind respectively by the frame element 58 and the base structure 52. If desired, end portions 80 and 82 of the bellows 74 may be structurally interconnected in any suitable manner with the surfaces 76 and 78. The bellows 74 may be evacuated and arranged mechanically so as to control the linear physical motion of points A and B in space, in unison with the external pressure that is perceived by the bellows as pressure from a pressure source P is introduced to the bellows by means of a pressure conducting conduit 84. The physical distance between points A and B will control and effect the radius of bend of the optical fiber which has opposed portions 68 and 70 thereof threaded through substantially parallel bores formed in the support elements 62 and 64. A light source 86 is provided having a light emitting portion 88 thereof positioned in abutting or closely spaced relation with the light receiving extremity 90 of the optical fiber 66. A light detector system 92 is provided having a light receiving portion 94 thereof positioned in light receiving abutting relation with the light emitting extremity 96 of the optical fiber. Suitable electronic circuitry 98 is interconnected with the light detector system and functions to process the light signals perceived by the light detector and render such signals to an electrical form which is then output to a suitable output conductor system 100. The output 100 of the electronic circuitry 98 may be interconnected with suitable recorder equipment in the event it is desired to display the output signals in a visually identifiable form.

As the pressure of the pressure source P increases, the distance between points A and B decreases due to bellows contraction which causes the movable frame element 58 to move toward the base structure 52 about the pivot hinge 56. This mechanical movement causes the radius R of the region of bend to decrease which consequently causes the detected light emitted from the light emitting extremity 96 of the optical fiber and perceived by the light detector 92 to also decrease in intensity. This decrease in intensity, of course, is caused by an increase in perturbance as the curvature of the region of bend 72 is decreased.

Since there is a linear relationship between pressure P and the intensity of light that is detected by the light detector 92, and a linear relationship between the detected light and the output electronic signal at the output 100, the result is the development of an electrical signal that is representative of the pressure of the pressure source. The transducer system identified in FIGS. 2 and 3 is, therefore, a pressure transducer incorporating an optical fiber transducer system. The transducer system does not invade the pressurized fluid system of the pressure souce P nor does it introduce any electrical signals into the system or develop electromagnetic activity that might interfere with optimum function of the pressure source system. The electrical aspects of the pressure transducer are remotely positioned with respect to the mechanical aspects of the transducer and are provided only to introduce light signals into the optical fiber system and to detect the intensity of light being emitted at the opposite end of the optical fiber system.

Referring now to FIGS. 4 and 5, it is demonstrated that an optical fiber transducer system may be effectively employed for the purpose of detecting flow of a fluid medium flowing through a conduit. The optical fiber transducer system, which in this case may be referred to as an optical fiber flow detection transducer, is illustrated generally at 102 in FIGS. 4 and 5. With egard to the function of the flow meter transducer, it is necessary to understand various characteristics of fluid flowing through a conduit system. Fluid flowing through a conduit, unless otherwise altered, tends to become laminar in nature. It is well known that under certain circumstances, the presence of an obstacle in a flow conduit will give rise to periodic vortices. For small Reynolds numbers, the downstream wake is laminar in nature, but at increasing Reynolds numbers, regular vortex paterns are formed. These paterns are known as Karman vortex streets. The frequency at which vortices are shed in a Karman vortex street is a function of flow rate. It is this phenomenon which is exploited to develop a flow meter of the vortex-shedding type. The vortex-shedding phenomenon is also exploited in the flow meter system set forth in FIGS. 4 and 5 hereof.

In a conduit 104, the directional fluid flow is indicated by means of a flow arrow at the left portion of FIG. 4. An obstacle 106 is positioned within the flow path and may be of any suitable configuration having the capability of developing desired vortices. One or more optical fibers 108, and collectively referred to in the singular, extend through the conduit 104 into the conduit flow passage 110. The optical fiber 108 extends through protective sheath elements 112 through 118 with opposed pairs of the sheath elements being positioned on opposite sides of the obstruction element 106. The obstruction element 106 is arranged to secure portions of the optical fiber in such manner that a pair of loops 120 and 122 are formed. Each of the loops 120 and 122 are of substantially the same dimension and each of the loops is extended through respective apertures 124 and 126 of a movable vortex responsive plate element 128. The optical fiber loops 120 and 122 are secured in substantially immovable relation with the plate element 128 such as by means of cement or by any other suitable means of retention. A reverse bent portion 130 of the optical fiber 108 is retained within a protective chamber 132 defined by a protective element 134 that is secured to the conduit 104.

A light source 136 is provided having a light emitting surface portion 138 thereof disposed in abutting or closely spaced relation with a light emitting extremity 140 of the optical fiber 108. A light detector mechanism 142 is arranged with a light receiving portion 144 thereof disposed in light receiving relation with a light radiating extremity 146 of the optical fiber.

The optical fiber loops 120 and 122 each define radii of curvature as shown at R in FIG. 4 which represent plural regions of bend in the optical fiber. As the vortex responsive plate element 128 moves upwardly or downwardly, its fixed relationship with the loops 120 and 122 causes the radii of curvature of the loops to change, thereby altering the total internal reflection capability of the optical fiber 108, Thus, the optical fiber emits light to the light detector 142 and this light is altered in intensity with alteration thereof being detected and converted into an appropriate electrical signal. As the vortices are shed within the flowing fluid from the obstruction 106, the vortices create stabilized fluidic oscillations within the flowing fluid medium with the signal frequency of the oscillations being proportional to the rate of flow within the conduit flow passage 110. The frequency of the vortices is converted into mechanical movement of the plate 128 thereby causing the plate 128 to oscillate at an induced frequency determined by the rate of flow within the flow passage 110. The intensity of light being emitted from extremity 146 of the optical fiber therefore has a varying intensity with variations being representative of the fluidic oscillations induced to the movable plate 128. Thus, the light detector system provides a transducer output signal 148 that may be utilized in any convenient manner to display or record the particular flow rate being monitored at any given time.

Although the fluid flow transducer 102 is illustrated with two optical fiber loops 120 and 122, it is not intended to limit the present invention to any particular number of optical fiber loops. It is intended only to illustrate that a flowing fluid medium yielding vortices that are responsive to the rate of flow may be employed to induce mechanical movement to a transducer structure that may be converted by an optical fiber system to appropriate signals for monitoring of the flow rate. This is accomplished efficiently without providing any electrical or electromagnetic interference with the flowing fluid system. In the event the flowing fluid medium should be of combustable character therefore, the rate of flow may be efficiently detected and monitored without any danger of explosion or fire.

From the foregoing, it is apparent that I have developed an optical fiber transducer system that is effectively responsive to mechanical movement. Moreover, this mechanical movement can be induced directly or indirectly in a mechanical sense, may be induced by fluid pressure or vacuum conditions, may be induced electrically or by any other suitable means. There is provided, therefore, an optical fiber transducer system that is effectively adaptable for detection and the monitoring of a wide range of phenomenon having adaptation to a wide range of efficient uses.

While there have been shown and described preferred embodiments in accordance with the invention, it will be appreciated that many changes and modifications may be made therein without, however, departing from the essential spirit thereof.

Having thus described my invention in detail, I claim:
1. An optical fiber transducer for detecting mechanical movement, comprising:
a length of a single optical fiber defining two extremities and having an intermediate portion thereof formed to define a region of bend having a variable radius of curvature that develops perturbance responsive to change of curvature;
an optical transmitter being optically coupled to one extremity of said optical fiber and transmitting light into said optical fiber;
a light detector means being optically coupled to the opposite extremity of said optical fiber and being capable of detecting the intensity of light being emitted from said opposite extremity of said optical fiber, said light detector means being responsive to the change to light intensity that results from change of curvature of said bend and thus being responsive to the physical phenomenon inducing said change in the radius of curvature of said bend; and signal generating means being coupled to said light detector means and generating electrical signals that are responsive to the intensity of light being detected by said light detector means, said electrical signals being representative of the state of perturbance of said optical fiber in said region of bend.

2. An optical fiber transducer as recited in claim 1, wherein said transducer detects the velocity of flow of fluid flowing through a flow passage and comprises:

a structural element being at least partially positioned within said flow passage, said structural element having oscillatory movement having a frequency of oscillation responsive to the velocity of fluid flow through said passage, said optical fiber forming loop means positioned within said flow passage, said loop means defining said region of bend, said structural element being interconnected with said loop of said optical fiber and inducing oscillatory movement to said region of bend, thus causing the output signals of said signal generating means to reflect the frequency induced by such oscillatory movement and thereby reflect the velocity of flow through said flow passage.

3. An optical fiber transducer as recited in claim 1 wherein said transducer is adapted to detect the velocity of fluid flowing through a flow passage and comprises:

an obstruction element being positioned within said flow passage and causing development of vortices in the fluid flowing through said flow passage; and a vortex responsive element being at least partially movably positioned within said flow passage downstream of said obstruction element and being oscillated responsive to the vortices of said flowing fluid, said region of bend of said optical fiber being located within said flow passage and being interconnected with said vortex responsive element in such manner as to induce oscillatory changes in the curvature of said region of bend in response to oscillatory movement of said vortex responsive element, the frequency of oscillatory light intensity changes received by said light detector means being translated in the form of oscillating electrical signals by said signal generating means, the frequency of oscillation of said electrical signals being indicative of the velocity of fluid flow through said flow passage.

4. An optical fiber transducer as recited in claim 3, wherein:

said bend region of said optic fiber defines loop means positioned within said flow passage; and said vortex responsive element is mechanically coupled to the central portion of said loop means of said optical fiber.

5. An optical fiber transducer as recited in claim 4, wherein:

a support element is positioned within said flow passage; and a portion of said loop is fixed to said support element.

6. An optical fiber transducer as recited in claim 1, wherein said transducer is adapted to detect the velocity of fluid flowing through a flow passage and comprises:

a structural element being positioned within said flow passage and causing development of vortices in the fluid flowing through said flow passage;

said length of optical fiber being of generally U-shaped form with the extremities thereof being positioned in side-by-side relation and defining a pair of spaced legs, each of said spaced legs being formed to define a loop, said loops being positioned in substantially parallel planes; and said vortex responsive element being a plate-like member being supported by each of said loops, oscillatory movement of said vortex responsive plate-like member responsive to the velocity of fluid flow causing oscillatory movement of said loops and consequent oscillatory changes in light intensity being received by said light detector means.

7. An optical fiber transducer as recited in claim 1, wherein said transducer is responsive to fluid pressure and comprises:

a mechanical device having opposed sides;

movable means interconnecting said opposed sides and being movable responsive to changes in fluid pressure, movement of said movable means inducing relative movement to said opposed sides, said opposed sides being positionable in particular spaced relation at respective pressures of fluid sensed by said movable means;

said length of optical fiber being interconnected with said opposed sides in such manner that said radius of curvature of said region of bend changes responsive to said relative movement and defines a particular bend radius reflecting the pressure sensed by said movable means thus developing a particular light intensity being transmitted by said optical fiber to said light detector.

8. An optical fiber transducer as recited in claim 7, wherein said movable means comprises:

a bellows interconnected with a source of pressure and having the capability of expanding and contracting responsive to the pressure of said source of pressure, said bellows being in operative engagement with said opposed sides and causing movement of said opposed sides in response to expansion and contraction of said bellows.

9. An optical fiber transducer as recited in claim 7, wherein said movable means comprises:

a sealed bellows adapted to be positioned within a pressurized fluid medium and having the capability of expansion and contraction responsive to changes in the pressure of said fluid medium, said bellows being in operative engagement with said opposed sides and causing movement of said opposed sides in response to expansion and contraction of said bellows.

10. An optical fiber transducer as recited in claim 7, wherein said mechanical device comprises:

a first structural element defining one of said opposed sides;

a second structural element defining the other of said opposed sides;

connector means extending from each of said first and second structural elements and being pivotally interconnected; and said length of optical fiber being formed to a U-shaped configuration with opposed end portions thereof defining spaced leg portions and with the intermediate portion thereof defining said region of bend, one of said leg portions being secured in substantially immovable relation with said first structural element and the other of said leg portions being secured in substantially immovable relation with said second structural element, relative movement of said leg portions of said optical fiber responsive to relative movement of said first and second structural elements causing change in the curvature of said region of bend.

11. An optical fiber transducer as recited in claim 10, wherein said movable means comprises:
a fluid pressure responsive element being in contact with said first and second structural elements and being capable of movement that is responsive to change in the pressure of the fluid within which said pressure responsive element is located, said movement of said fluid pressure responsive element inducing relative movement to said first and second structural elements.

12. An optical fiber transducer as recited in claim 11, wherein said fluid pressure responsive element comprises:
an evacuated bellows located within a pressurized fluid and having the capability of expanding and contracting responsive to the pressure of said fluid, said bellows being in operative engagement with said opposed sides.

13. An optical fiber transducer is recited in claim 1 which is adapted to provide signals representing the physical cross-sectional dimension of a body and signals representing changes in the physical cross-sectional dimension of the body, said transducer comprising:
first constraining means;
said length of optical fiber having end portions thereof that are constrained against relative movement by said first constraining means, said optical fiber being formed to define first and second loops, said first loop defining said region of bend and said second said loop adapted to circumscribe said body, said first and second loops being so related that expansion and contraction of said second loop by changes in the cross-sectional dimension of said body induces a change in the dimension of said first loop and thus changes the curvature of said region of bend.

14. An optical fiber transducer as recited in claim 13, wherein said transducer includes:
means controlling the minimum radius of curvature of said region of bend.

15. An optical fiber transducer as recited in claim 13, wherein said transducer includes:
calibration means fixing end portions of said length of optical fiber in relation to one another and setting the response parameters of said first and second loops.

16. An optical fiber transducer as recited in claim 13, wherein:
said first and second loops substantially define a FIG. "8" and said length of optical fiber crosses itself to define an intersection between said first and second loops; and
second constraining means receiving said intersection of said optical fiber in such manner as to allow relative movement of said fiber at said intersection permitting said change in the relative dimensions of said first and second loops.

17. An optical fiber transducer as recited in claim 16, wherein said transducer includes:
means controlling the minimum radius of curvature of said region of bend; and
calibration means fixing end portions of said length of optical fiber in relation to one another and setting the response parameters of said first and second loops.

18. An optical fiber transducer as recited in claim 13, wherein:
the combined dimensions of said first and second loops remains constant regardless of the relative dimensions of said first and second loops.

19. An optical fiber transducer as recited in claim 13, wherein said second constraining means comprises:
an annular element defining an aperture of sufficient diameter that said intersection of said optical fiber is loosely received therein, said annular element permitting movement of said optical fiber through said aperture to permit dimensional changes of said first and second loops.

20. A method of detecting mechanical movement and providing signals representative of such movement, said method comprising:
providing single strand optical fiber means which is oriented in such manner as to define a region of bend intermediate the extremities thereof;
introducing light into one extremity of said optical fiber means;
positioning said optical fiber means in physical fiber moving relation with a movable object in such manner that movement of said movable object causes alteration of the curvature of said region of bend and thus alters the total internal reflection of said optical fiber means resulting in alteration of the intensity of light radiating from the opposite entremity of said optical fiber means, the intensity of emitted light being a variable signal the variations of which represent mechanical movement of said object;
detecting changes in the intensity of said light being emitted from said opposite extremity of said optical fiber; and
converting the intensity of light signals being received into electrical signals responsive to the intensity of light signals and providing electrical output signals representing light intensity.

21. A method as recited in claim 20, including:
inducing mechanical movement to said object in response to the rate of fluid flow through a flow conduit.

22. A method as recited in claim 20 including:
inducing oscillatory movement to said object wherein the oscillations represent the rate of fluid flow through a flow conduit.

23. A method as recited in claim 20, including:
inducing said mechanical movement to said object responsive to the fluid pressure of a pressure source, whereby said emitted light intensity is representative of the pressure of said pressure source.

24. A method as recited in claim 20, including:
positioning a loop of said optical fiber means about an object capable of changing the physical dimension thereof, said mechanical movement being changes in the physical dimension of said object; and
inducing alteration of said loop and said region of bend responsive to changes in the physical dimensions of said object.

* * * * *